Aug. 15, 1939.  C. R. WEISS ET AL  2,169,625
BELT CONVEYER IDLER
Filed March 12, 1938   2 Sheets-Sheet 1
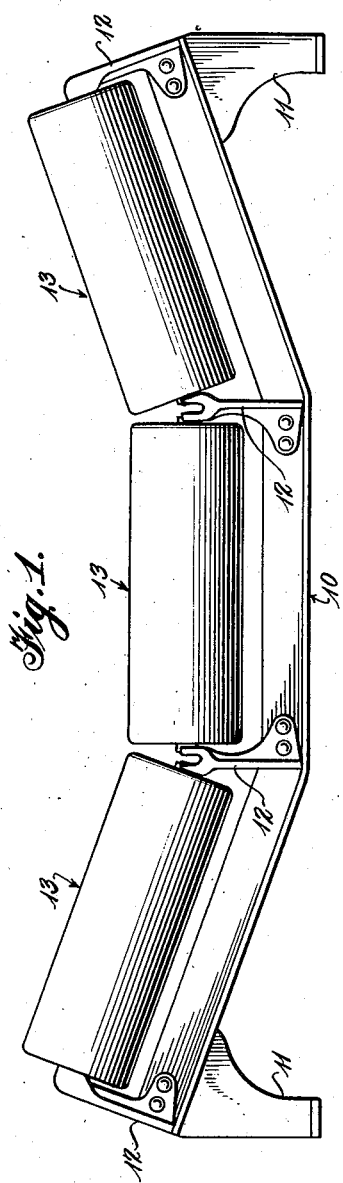
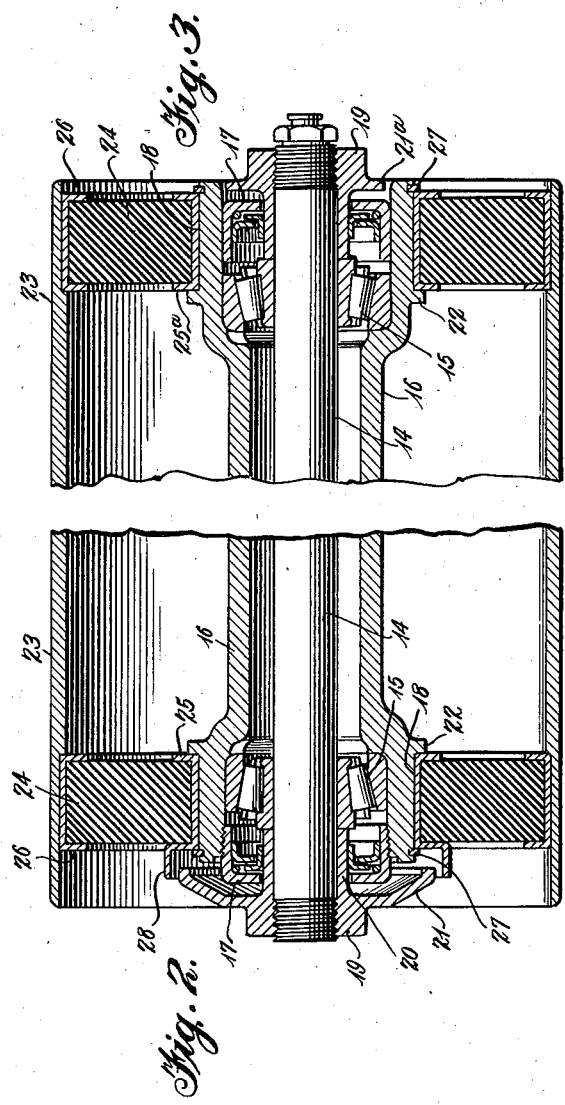
Inventors
Charles R. Weiss and
Richard W. Parker
By L. Donald Myers
Attorneys Aug. 15, 1939. C. R. WEISS ET AL 2,169,625
BELT CONVEYER IDLER
Filed March 12, 1938 2 Sheets-Sheet 2
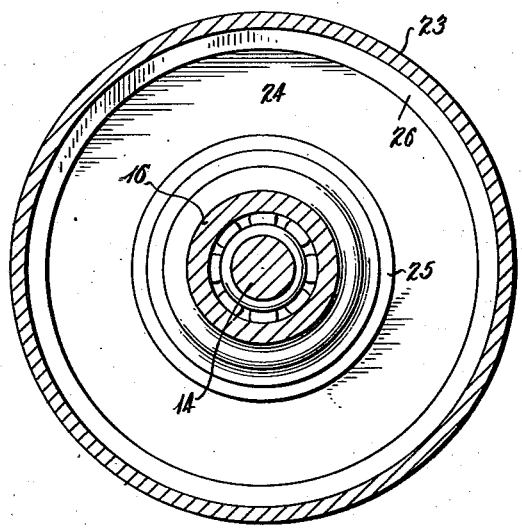
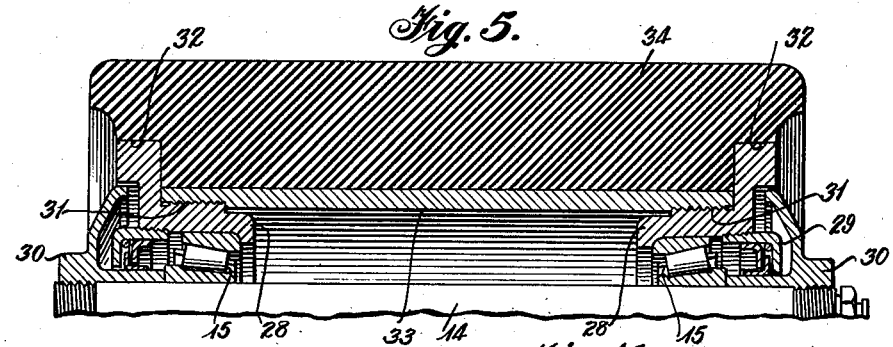
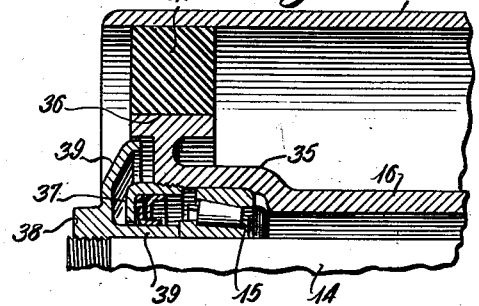 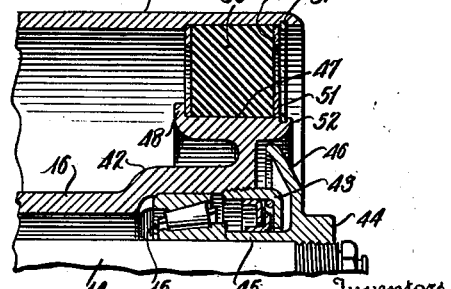
Inventors
Charles R. Weiss and
Richard W. Parker
By L. Donald Myers
Attorney Patented Aug. 15, 1939

2,169,625

UNITED STATES PATENT OFFICE 2,169,625

BELT CONVEYER IDLER

Charles R. Weiss and Richard W. Parker, Indianapolis, Ind., assignors to Link-Belt Company, a corporation of Illinois Application March 12, 1938, Serial No. 195,606

7 Claims. (Cl. 198—192)

This invention relates to new and useful improvements in belt conveyer idlers.

Conveyers of the endless belt type are frequently loaded by having the objects or materials being handled delivered to the belt by gravity with the result that the belts are repeatedly being subjected to impact blows.

Idlers are employed for supporting the endless belt during its travel through both runs, and it is the usual practice to position two or more rather closely located idlers at the loading point or points to properly sustain the belt. Conveyer belt supporting idlers include one or more rolls which directly contact the belt. These rolls usually are made of metal and are of a very rigid and non-yielding construction. The conveyer belt, therefore, is subjected to considerable punishment as it passes between the non-yielding idler rolls and the loading mechanism, and this is particularly true when the objects or material being handled possess sharp corners or points.

If the material or objects being conveyed are heavy enough to cause the belt to sag between adjacent idlers, the non-yielding character of the rolls results in jarring and jolting the material or objects as they pass thereover.

It is the primary object of this invention to provide belt conveyer idlers which are equipped with rolls of proper construction to absorb and resist shocks and impact blows delivered thereagainst from any cause and particularly as a result of objects and materials being dropped onto the belt riding over said rolls.

A further important object of the invention is to provide idler rolls which will yield to the passage of objects and material thereover so as to make possible the smooth travel of the same throughout the entire length of the active run of the belt.

Other objects and advantages of the invention will be apparent during the course of the following description.

In the accompanying drawings forming a part of this specification and in which like numerals are employed to designate like parts throughout the same.

Figure 1 is a side elevational view of a belt conveyer idler employing rolls of the character embodying this invention.

Figure 2 is a fragmentary sectional view of one end portion of a particular form of idler roll embodying this invention, Figure 3 is a fragmentary sectional view disclosing an end portion of a slightly modified form of idler rolls, Figure 4 is a transverse sectional view taken through either of the rolls disclosed in Figs. 2 and 3, Figure 5 is a fragmentary longitudinal sectional view disclosing a still further modified form of idler roll, Figure 6 is a fragmentary sectional view of a portion of a further modified form of idler roll, and Figure 7 is a similar view to Fig. 6, but discloses another form of idler roll.

In the drawings, wherein for the purpose of illustration are shown the preferred embodiments of this invention, and particularly referring to Fig. 1, the reference character 10 designates the frame portion of a belt conveyer idler which is supported at its opposite ends by means of legs 11. Suitably spaced along the length of the frame 10 are bracket arms 12 which function to suitably support the idler rolls 13. It is to be understood that these rolls 13 may take the form of any one of the several roll structures disclosed and described herein.

The first form of idler roll to be described is illustrated in Fig. 2. This figure discloses only one end portion of a roll. It is to be understood that the remaining end of the roll is of the same construction. This roll includes a central shaft 14 on which is mounted an anti-friction bearing unit 15. This unit rotatably supports the adjacent end of a tubular hub 16 which is concentrically arranged with respect to the shaft 14. To exclude dust and foreign matter from the anti-friction bearing structure 15 and to retain lubricant in this bearing, a grease shield 17 is threadedly mounted in the end of the hub 16.

It will be noted that the end portion of the hub 16 is formed with an annular seat 18 which is formed by offsetting or enlarging the tublar hub. This offsetting of the hub to form the seat 18 provides a bore enlargement which receives the anti-friction bearing unit 15 and prevents axial inward movement of the bearing relative to the hub. To prevent outward movement of the bearing relative to the hub, a nut 19 is threaded onto the end of the shaft. This nut includes a sleeve 20 which bears against the outer end of the inner bearing raceway. A hood-like flange 21, also, is formed on the nut 19 to act as a shield for the end of the hub and its enclosed bearing unit. The seat 18 at the end portion of the hub 16 is backed up or defined at its inner edge by means of the upstanding flange 22.

A suitable tread structure is mounted on the hub in a manner to permit detachment of the tread therefrom. This tread includes a cylindrical, metallic shell 23 which is concentrically mounted on the hub 16 and supported so as to readily yield with respect thereto by means of the rubber ring 24. This rubber ring is reinforced and braced by the opposed, channel-shaped, metallic inner and outer rings 25 and 26. It is preferred that the rubber ring 24 be molded in these channel-shaped rings 25 and 26. The rubber ring 24 with its channel-shaped reinforcing rings 25 and 26 is mounted on the seat portion 18 of the hub 16. The annular flange 22 retains the ring 24 against axial inward movement with respect to the hub. To prevent axial outward movement of the ring 24, a split locking ring 27 is seated in a groove formed in the extremity of the hub. The outer channel-shaped ring 26 bears against the inner surface of the peripheral shell portion 23 of the roller tread.

The inner channel-shaped metallic ring 25 is provided with an axially extending, annular flange 28 on its outer side. This annular flange 28 cooperates with the hood-like flange 21 of the nut 19 to prevent entrance of foreign matter into the end portion of the hub 16.

Figure 3 discloses a form of idler roll which differs but slightly from the construction disclosed in Figure 2. This modified form of idler roll includes the shaft 14 with its anti-friction bearing unit 15 and the hub 16 rotatably mounted on the shaft by means of the bearing unit. A grease seal and dust shield 17 is received within the enlarged seat portion 18 of the hub. To retain the seal 17 in place and to prevent outward movement of the anti-friction bearing unit 15, a nut 19 is threadedly mounted on the end of the shaft 14. The tread portion of this idler roll includes a metallic, cylindrical shell 23 which is supported on the hub 16 for yieldable movement with respect thereto by means of the rubber ring 24. This rubber ring has its inner and outer margins confined within the channel-shaped, metallic rings 25a and 26. The rubber ring 24 with its reinforcing, channel-shaped ring 25a is seated on the annular portion 18 of the hub 16. An annular flange 22 defines the inner edge of the hub seat 18 and functions to prevent inward axial movement of the rubber ring 24. The ring 24 is prevented from axial outward movement by means of a split locking ring 27 which is seated in a groove formed in the extremity of the seat portion 18.

It will be appreciated by comparing the disclosures of Figs. 2 and 3 that the nut 19 of the Fig. 2 structure possesses a shield 21 while the nut 19 of the Fig. 3 structure does not have this shield. A further difference between these two roll structures is that the outer side of the channel-shaped ring 24a does not have the axially extending flange 28 to cooperate with a nut flange. The nut 19 of Fig. 3, however, does have a radially extending flange 21a which functions to substantially close the end of the hub bore.

In Fig. 5, there is disclosed a further modified form of idler roll. This roll includes a central shaft 14 which has mounted on each end portion of the same an anti-friction bearing structure 15. A roller hub is formed in this assembly by means of the two separate, annular heads 28 which are spaced along the shaft 14 and are rotatably mounted thereon by means of the bearing units 15.

To exclude dust and other foreign matter from the bearing units and to retain lubricant in said units, grease seals 29 are threadedly mounted within each one of the hub heads 28. To retain the hub heads and the bearings from axial outward movement, a nut 30 is threaded on each end of the shaft 14. Each one of the hub heads 28 is provided with a stepped annular seat which is formed by the shoulders 31 and 32.

The tread portion of this roll structure includes a cylindrical shell 33 on the outer surface of which is positioned a thick rubber ring 34 which is shaped at its opposite ends to receive the shoulder portions 32 of the hub heads 28. It will be noted that the opposite ends of the shell 33 are internally screw threaded for being connected to the hub heads 28 so that this shell will retain the heads in proper spaced relation with respect to the length of the shaft 14.

In Fig. 6, there is disclosed another form of idler roll. This figure merely discloses half of one end portion of the roll. It is to be understood that both ends of the roll are of the same construction and that practically all of the elements disclosed in this figure are of annular formation.

This roller structure includes a shaft 14 on which is mounted an anti-friction bearing structure 15. A hub 16 is rotatably mounted on the shaft 15 by means of the bearing unit. The hub is enlarged at 35 to receive the bearing unit and is provided with a radially projecting seat portion 36.

A grease seal 37 is threaded into the end of the enlarged hub portion 35 for retaining lubricant in the bearing unit 15 and for excluding dust and other foreign matter. To retain the bearing unit 15 in place on the shaft 14 and within the enlarged portion 35 of the hub, a nut 38 is threaded on the shaft and includes an axially projecting sleeve portion 39 which engages the outer edge of the inner raceway for the anti-friction bearing unit 15. This nut 38 is provided with a hood-like flange 39a which cooperates with the seat portion 36 to further prevent the entrance of foreign matter into the bearing unit 15.

The tread portion of the roll structure includes a metallic shell 40 which is supported concentrically with the hub 16 and in spaced relation thereto by means of the rubber ring 41. This ring is vulcanized to the seat portion 36 of the hub 16 and to the inner surface of the shell 40.

Fig. 7 discloses, in the same manner as Fig. 6, a further modified form of idler roll. This structure includes a shaft 14 having an anti-friction bearing unit 15 mounted thereon. Rotatably supported on the shaft 14 by means of the bearing 15 is a hub 16 having an enlarged end portion 42 for receiving the bearing unit 15. To exclude dust and other foreign matter from the bearing and to retain lubricant therein, a grease seal 43 is threaded into one end of the enlarged portion 42 of the hub 16. To retain the bearing unit 15 and the hub 16 in proper position upon the shaft 14, a nut 44 is threaded on the end of the shaft. This nut is provided with an axially extending sleeve portion 45 which engages the inner raceway of the bearing unit 15 to retain this unit in position upon the shaft. A hood-like flange 46 is formed on the nut 44 and cooperates with the annular seat portion 47 for further functioning to exclude dust and other foreign matter from the bearing unit 15.

The annular seat portion 47 is provided with an integral, radially projecting flange 48 which defines the inner edge of the seat portion.

The tread part of the roll structure includes a metallic shell 49 which is supported in concentric relation with respect to the hub 16 and spaced therefrom by means of the rubber ring 50. The inner and outer margins of this ring are reinforced and braced by means of the four metallic rings or washers 51. To lock the rubber ring 50 and the four bracing rings 51 in position relative to the hub seat 47 and the shell 49, split locking rings 52 are seated in grooves formed in the periphery of the seat 47 and the inner surface of the shell 49.

It will be appreciated that each one of the idler roll structures disclosed in Figs. 2 to 7, inclusive, will be capable of supporting a conveyer belt in a manner to effectively absorb and resist shocks resulting from impact blows delivered against the belt by material fed thereon by means of gravity. These roll structures, also, will yield to the passage of material or objects over the idlers equipped with the rolls so that the material or objects will be permitted to smoothly traverse the entire length of the active run of the conveyer belt.

The roll structures of Figs. 2 to 4, inclusive, and 7 may be completely broken down into a plurality of different parts so that elements or parts which are subjected to wear or abuse may be replaced without discarding the entire roll structure. Also, many of the parts of each roll structure can be used in rolls of different lengths by being associated with the remaining elements produced in proper sizes or lengths. This makes possible the assembly of a full line of conveyer rolls as orders are received for the same and obviates the necessity of keeping in stock a full line of pre-fabricated rolls. Although Fig. 1 only discloses an idler designed for handling troughed belts, it is to be understood that a single roll of proper length to support the entire width of a conveyer belt may be constructed in accordance with any of the roller structures disclosed in the several figures.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. In a belt conveyer idler, a roll comprising a shaft, a hub concentric with the shaft, bearings for rotatably mounting the hub on the shaft, said hub having an annular seat formed at each end portion of the same, a cylindrical metallic shell surrounding the hub, and a rubber ring mounted on each of said hub seats and connected to the end portions of the shell, said rubber rings being of proper radial thickness to permit the shell to be displaced radially and axially and to assume different angular positions relative to the axis of the hub.

2. In a belt conveyer idler, a roll comprising a shaft, a hub concentric with the shaft, bearings for rotatably mounting the hub on the shaft, said hub having an annular seat formed at each end portion of the same, a cylindrical metallic shell encircling said hub, a rubber ring encircling each of said hub seats and means for detachably securing said rings to said hub seats and to the end portions of the shell, said rubber rings being of proper radial thickness to permit the shell to be displaced radially and axially and to assume different angular positions relative to the axis of the hub.

3. In a belt conveyer idler, a roll comprising a shaft, a hub concentric with the shaft, bearings for rotatably mounting the hub on the shaft, said hub having an annular seat formed at each end portion of the same, a cylindrical metallic shell surrounding said hub, a rubber ring encircling each of said hub seats and connected to the end portions of the shell, and means for reinforcing the inner and outer margins of said rubber rings.

4. In a belt conveyer idler, a roll comprising a shaft, a hub concentric with the shaft, bearings for rotatably mounting the hub on the shaft, said hub having an annular seat formed at each end portion of the same, a cylindrical metallic shell concentric with the hub, a rubber ring encircling each of said hub seats and connected to the end portions of said shell, and channel-shaped metallic rings confining the inner and outer margins of the rubber rings, the portions of the rubber rings arranged between their metallic ring confined margins being of sufficient mass to permit the shell to be displaced radially and axially and to assume different angular positions relative to the axis of the hub.

5. In a belt conveyer idler, a roll comprising a shaft, a tubular hub concentric with the shaft, said hub being enlarged at its ends to provide internal annular seats at the ends of its bore and external annular seats overlying said internal seats, bearings for rotatably mounting the hub on said shaft received in the internal seats, resilient means secured to each external annular seat, and a cylindrical metallic shell supported on said resilient means for bodily movement in all directions relative to said hub.

6. In a belt conveyer idler, a roll comprising a shaft, a tubular hub concentric with the shaft, said hub being enlarged at its ends to provide internal annular seats at the ends of its bore and external annular seats overlying said internal seats, each of said internal and external seats having an abutment at its inner side, bearings for rotatably mounting the hub on said shaft received in the internal seats and held separated by their abutments, a rubber ring mounted on each external seat and held separated by their abutments, and a cylindrical metallic shell supported on said rubber rings for bodily movement in all directions relative to said hub.

7. In a troughed belt conveyer idler of the type which includes frame means for supporting a plurality of angularly arranged idler rolls, an idler roll comprising a rigid hub journaled for rotary movement only, a cylindrical rigid shell for the hub, and a rubber ring connecting each end portion of the shell and the adjacent portion of its hub to permit the shell to be bodily displaced radially and axially and to assume different angular positions relative to the axis of its hub in response to loads transported over the idler by a belt trained thereon.

CHARLES R. WEISS.
RICHARD W. PARKER.